3,314,952
PROCESS FOR MAKING TERTIARY AMINES
Ralph M. Robinson, Waukegan, Ill., assignor to Abbott Laboratories, Chicago, Ill., a corporation of Illinois
No Drawing. Filed Sept. 1, 1964, Ser. No. 393,723
8 Claims. (Cl. 260—247)

The present application is a continuation-in-part of my copending application, Ser. No. 200,652, filed June 7, 1962, now abandoned.

The present invention is concerned with the preparation of tertiary amines; more particularly it is concerned with the preparation of N-cyclohexylpiperidine, N-cyclohexylmorpholine, N-cyclohexylpiperazine, and N,N'-dicyclohexylpiperazine, which may be substituted in the heterocyclic ring by a loweralkyl group.

In the past, various methods have been reported for producing the above N-cyclohexylheterocycles but all these older methods are so impractical and uneconomical that they amount to nothing more than laboratory curiosities. One of the more recent processes published by Sawa in J. Pharm. Soc. Japan 64, 253–5 (1944) recites a general method for the production of 1-alkylpiperidines; it shows a method of hydrogenating a mixture of pyridine and phenol in the presence of Raney nickel. In spite of necessitating high pressures of hydrogen gas, a yield of only 12% N-cyclohexylpiperidine is reported. Obviously, such a preparation of N-cyclohexylpiperidine is impractical and economically not feasible.

It is therefore an object of the present invention to provide a new and improved process for the manufacture of N-cyclohexylheterocycles wherein the heterocyclic nucleus may be substituted by a loweralkyl group. It is another object of the present invention to provide a low-pressure process for the production of N-cyclohexylheterocycles of the type identified above. It is a further object of the present invention to produce high yields of N-cyclohexylheterocycles by a catalytic hydrogenation process from commonly used, inexpensive, starting materials. It is a still further object to provide a commercially feasible process for the production of N-cyclohexylheterocycles which may carry an alkyl substituent in the heterocyclic ring.

These and other objects are accomplished by providing a process for making tertiary amines of the formula

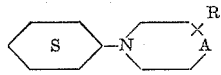

wherein A is selected from the group consisting of

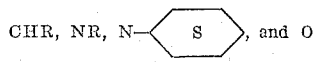

and wherein R represents hydrogen or loweralkyl, which comprises reacting together phenol, hydrogen, and a heterocyclic reactant selected from pyridine, piperidine, piperazine and morpholine, with optional loweralkyl substituents in the heterocyclic ring, in the presence of a catalytic amount of palladium at a hydrogen pressure below 100 p.s.i.g.

In a simple embodiment, pyridine is placed in a hydrogenation flask such as a Parr shaker, a still, or other low-pressure equipment, together with an equimolar amount of phenol. After adding between 0.05 and 1.0 part of metallic palladium supported on a carrier per 100 parts of combined pyridine and phenol, the hydrogenation equipment is flushed in the customary manner with nitrogen and subsequently with hydrogen to remove all oxygen from the flask. Hydrogenation is then initiated by external heating and shaking of the hydrogenation flask and continued until hydrogen uptake ceases. After hydrogen uptake is completed, the catalyst is filtered off and the filtrate is separated into its components by distillation.

In order to show the hydrogenation times required and the yields obtained, reference is made to the following typical examples which are to be considered representative illustrations only and are not to be interpreted as limitations for the process of the present invention.

EXAMPLE 1

A mixture of 21.2 grams of piperidine (0.25 mole), 23.5 grams of phenol (0.25 mole), 2.0 grams of catalyst consisting of 5% palladium on carbon (catalyst ratio 0.224% of metal based on the combined weight of reactants) and 1.0 gram of a filter aid is placed in a Parr hydrogenation flask. The mixture is hydrogenated with external heating to a maximum temperature of 96°C. and under a maximum hydrogen pressure of 59.0 p.s.i.g. Within 6 hours, more than 75% of the theoretical amount of hydrogen is absorbed and the theoretical amount of hydrogen is taken up within less than 15 hours. The mixture is filtered and the filtrate is distilled, giving a main fraction analyzing 98.8% N-cyclohexylpiperidine. The infrared analysis of this fraction is identical with that of any analytical sample of N-cyclohexylpiperidine.

When, in the above experiment, the catalyst is supported by alumina with otherwise identical reaction conditions, substantially the same result is obtained.

EXAMPLE 2

A mixture of 19.8 grams of pyridine, 23.5 grams of phenol, 2 grams of a catalyst consisting of 5% palladium (0.23% of combined weight of reactants) on charcoal and 1 gram of a filter aid is hydrogenated in a Parr shaker with a maximum temperature of 97° C. and a maximum hydrogen pressure of 59.1 p.s.i.g. After 6 hours, over 60% of the theoretical amount of hydrogen is observed and hydrogenation is completed after 22 hours. After filtration, gas chromatographic analysis of the crude product mixture shows 92.5% N-cyclohexylpiperidine and 7.3% of piperidine.

EXAMPLE 3

A mixture of 18.6 grams of α-picoline (0.2 mole), 18.8 grams of phenol (0.2 mole), 2 grams of a catalyst consisting of 5% palladium (0.27% of combined weight of reactants) on charcoal and 1.0 gram of a filter aid is hydrogenated at a maximum hydrogen pressure of 58.7 p.s.i.g. and a maximum temperature of 100° C. After 22 hours, the catalyst is filtered off, leaving a clear, colorless solution. Gas chromatographic analysis of this solution indicates 66.5% of N-cyclohexyl-2-methylpiperidine, 9.5% of 2-methylpiperidine, 0.7% unreacted α-picoline, 10.8% cyclohexanol, and 12.6% other saturated cyclic products.

EXAMPLE 4

A mixture of 18.6 grams of β-picoline, 18.8 grams of phenol, 2.0 grams of a catalyst consisting of 5% palladium on charcoal and 1.0 gram of a filter aid is hydrogenated under a maximum pressure of 59.5 p.s.i.g. and a maximum temperature of 105.5° C. Hydrogen uptake is almost theoretical in 18 hours. After filtration, the clear, colorless solution shows 95.2% N-cyclohexyl-3-methylpiperidine, 3% of unreacted β-picoline, 0.2% of cyclohexanol, and 0.3% of 2-methylpiperidine by gas chromatographic analysis. The product solution is fractionally distilled under reduced pressure, producing a main fraction analyzing 99% pure N-cyclohexyl-3-methylpiperidine.

When, in the above experiment, the catalyst is supported by alumina with otherwise identical reaction conditions, substantially the same result is obtained.

EXAMPLE 5

A mixture of 24.2 grams of 2-n-propylpyridine (0.2 mole), 18.8 grams of phenol, 1.74 grams of a catalyst consisting of 5% palladium (0.20% of combined weight of reactants) on carbon and 1.0 gram of a filter aid is hydrogenated in a Parr shaker at a maximum temperature of 94° C. and a maximum hydrogen pressure of 58.4 p.s.i.g. In less than 23 hours, the theoretical amount of hydrogen is taken up by the reaction mixture. Filtration produces a clear, colorless filtrate which, on gas chromatographic analysis, shows 51.8% N-cyclohexyl-2-n-propylpiperidine, 27.6% 2-n-propylpiperidine, 11.8% cyclohexanone, and 8.7% cyclohexanol.

EXAMPLE 6

A mixture of 24.2 grams of 4-n-propylpyridine, 18.8 grams of phenol, 2.3 grams of a palladium catalyst consisting of 5% metallic palladium (0.27% of combined weight of reactants) on carbon and 1.0 gram of a filter aid is hydrogenated under a maximum pressure of 58.5 p.s.i.g. and a maximum temperature of 96° C. After hydrogen uptake is complete (24 hours), the mixture is filtered and the filtrate analyzed by gas chromatography, showing 97.8% N-cyclohexyl-4-n-propylpiperidine.

EXAMPLE 7

A mixture of 50 grams of N-methylpiperazine, 47.1 grams of phenol, and 8.3 grams of a palladium catalyst consisting of 5% metallic palladium (0.43%) of combined weight of reactants) on carbon, is hydrogenated at a hydrogen pressure between 38 and 65 p.s.i.g. and at a temperature of 98–104° C. The theoretical amount of hydrogen is absorbed by the mixture in 22 hours. The mixture is filtered and the clear filtrate is analyzed by gas chromatography, showing 96.1% of N-cyclohexyl-N'-methylpiperazine. Distillation under reduced pressure gives 65 grams of a colorless liquid (71% yield) of which the chemical analysis is in excellent agreement with the theoretical values.

EXAMPLE 8

A mixture of 47.1 grams of phenol, 22.0 grams of anhydrous piperazine, 8.0 grams of a catalyst consisting of 5% metallic palladium (0.58% of combined weight of reactants) on carbon, and 30 ml. of ethanol containing 5% methanol, is hydrogenated between 33 and 61 p.s.i.g. hydrogen pressure and at a temperature between 104° and 119° C. The reaction is interrupted after 24 hours in which time 92% of the theoretical amount of hydrogen is taken up. The clear, homogeneous filtrate starts to crystallize and after the alcohol is distilled off at atmospheric pressure, the obtained N,N'-dicyclohexylpiperazine is distilled under reduced pressure. The chemical analysis is in excellent agreement with the theoretical values for this compound.

When, in this example, the amount of piperazine is doubled, a mixture of N,N'-dicyclohexylpiperazine and N-cyclohexylpiperazine is obtained together with some unreacted piperazine. In this manner, N-cyclohexyl-piperazine can be obtained, by fractionation of the filtered product solution, but the yield is correspondingly lower.

EXAMPLE 9

A mixture of 47.1 grams of phenol, 43.6 grams of morpholine, and 4.0 grams of a catalyst consisting of 5% metallic palladium (0.22% of combined weight of reactants) on carbon, is hydrogenated at 37 to 63 p.s.i.g. hydrogen pressure and at a temperature between 84° and 114° C. After 24 hours, 99% of the theoretical amount of hydrogen is taken up and the mixture is filtered. The filtrate shows a very small lower phase. The large upper phase is analyzed by gas chromatography, showing 92.5% of N - cyclohexylmorpholine. Atmospheric distillation gives 50.6 grams (60%) of the pure compound boiling at 235–240° C.; the analytical result is in excellent agreement with the calculated values.

With the above examples it will be seen that the method of the present invention provides a convenient, economical, low-pressure synthesis of N-cyclohexylheterocyclic compounds which may be substituted in the heterocyclic ring by a loweralkyl group. In this manner, the N-cyclohexyl-substituted piperidine, C-loweralkylpiperidines, morpholine, piperazine and loweralkylpiperazines can be made in good yields and in excellent quality. The term "loweralkyl" used herein designates alkyl chains containing 1–4 carbon atoms which may be arranged in a straight or branched chain.

The advantages of the present invention lie in the facts that from inexpensive, commercially-available starting materials, high yields of bicyclic saturated compounds can be made by a simple, one-step operation, that no high pressures are necessary, and that small amounts of catalyst will provide excellent results.

For practical reasons, the amount of metallic palladium is chosen between about 0.05% and 1.0% of the metal based on the combined amounts of phenol and the heterocyclic coreactant. When smaller amounts of the catalyst are used, hydrogen uptake may be too slow for economical operation, while catalyst ratios above 1% will not produce results appreciably better than a catalyst ratio selected within the above range.

It is greatly surprising that the present invention can be performed with a palladium catalyst where pyridine or an alkyl-substituted pyridine is used as the starting material, since pyridine ordinarily cannot be saturated with this catalyst: there is no reaction known to hydrogenate a pyridine ring under the mild conditions of the present process. Another beneficial aspect of the present invention is that the catalyst can be reused, i.e., after the catalyst is filtered off from the hydrogenation mixture, it can be used for subsequent reductive condensation reactions without purification or regeneration. The catalyst can be supported by charcoal, zirconium oxide, bentonite, alumina, silica, kieselguhr, and similar commonly used catalyst carriers.

The hydrogenation reaction of the present invention is preferably carried out within a temperature range of 60–120° C. and at hydrogen pressures below 100 p.s.i.g. which enables the use of the so-called low-pressure hydrogenation equipment.

In most embodiments of the present invention, the use of a solvent is not desirable, although the presence of an inert solvent is not detrimental to the process and only necessitates a more complicated separation process for the desired tertiary amine. However, when the alkyl pyridine or alkyl piperidine used as starting reactant is a solid, the use of an inert solvent boiling above 60° C. may be desired. The term "inert" is used to express that the solvent so described does not interfere with any of the reactants present in the reaction mixture. Among the solvents useful under the above described circumstances are alcohols such as ethanol, propanol, isopropanol, butanol and ethylacetate. For best results, an inert solvent is chosen which has a boiling point above 80° C., to enable higher reaction temperatures without the use of excessive pressures.

Others may practice the invention in any of the numerous ways which will be suggested to one skilled in the art by the present disclosure. All such practice of the invention is considered to be a part hereof provided it falls within the scope of the appended claims.

I claim:

1. A process of preparing tertiary amines of the formula

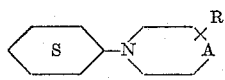

wherein A is selected from the group consisting of

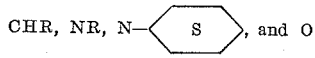

and wherein R is selected from the group consisting of hydrogen and loweralkyl, consisting essentially of hydrogenating a mixture of phenol and a heterocyclic reactant selected from the group consisting of pyridine, piperidine, morpholine, and piperazine, carrying in the heterocyclic moiety a substituent R, with gaseous hydrogen at a pressure between atmospheric pressure and 100 p.s.i.g. at a temperature between 60° C. and 120° C. in the presence of catalytic amounts of palladium.

2. The process of claim 1 wherein said amount of palladium is between 0.05 and 1.0 part per 100 parts of the combined weights of said phenol and said heterocyclic reactant.

3. The process of claim 1 wherein equimolar amounts of said phenol and said heterocyclic reactant are subjected to hydrogenation.

4. The process of claim 3 wherein said heterocyclic reactant is pyridine.

5. The process of claim 3 wherein said heterocyclic reactant is a picoline.

6. The process of claim 3 wherein said heterocyclic reactant is piperazine.

7. The process of claim 6 wherein said piperazine is present in about half the equimolar amount of said phenol.

8. The process of claim 3 wherein said heterocyclic reactant is morpholine.

No references cited.

ALEX MAZEL, *Primary Examiner.*

NICHOLAS S. RIZZO, *Examiner.*

J. TOVAR, *Assistant Examiner.*